United States Patent
Kim et al.

(10) Patent No.: US 12,555,784 B2
(45) Date of Patent: Feb. 17, 2026

(54) CATHODE ACTIVE MATERIAL FOR LITHIUM SECONDARY BATTERY, CATHODE INCLUDING SAME, AND LITHIUM SECONDARY BATTERY INCLUDING SAME

(71) Applicant: Samsung SDI Co., Ltd., Yongin-si (KR)

(72) Inventors: Jinhwa Kim, Yongin-si (KR); Jongmin Kim, Yongin-si (KR); Wooyoung Yang, Yongin-si (KR); Kwanghwan Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 465 days.

(21) Appl. No.: 16/958,896

(22) PCT Filed: Jan. 23, 2019

(86) PCT No.: PCT/KR2019/000935
§ 371 (c)(1),
(2) Date: Jun. 29, 2020

(87) PCT Pub. No.: WO2019/147002
PCT Pub. Date: Aug. 1, 2019

(65) Prior Publication Data
US 2020/0343552 A1    Oct. 29, 2020

(30) Foreign Application Priority Data
Jan. 29, 2018  (KR) ................ 10-2018-0010959
Jan. 22, 2019  (KR) ................ 10-2019-0008380

(51) Int. Cl.
*H01M 4/525* (2010.01)
*H01M 4/505* (2010.01)
*H01M 10/0525* (2010.01)

(52) U.S. Cl.
CPC .......... *H01M 4/525* (2013.01); *H01M 4/505* (2013.01); *H01M 10/0525* (2013.01)

(58) Field of Classification Search
CPC ... H01M 4/505; H01M 4/525; H01M 10/0525
See application file for complete search history.

(56) References Cited

U.S. PATENT DOCUMENTS

2006/0134521 A1* 6/2006 Shima ................ H01M 4/131
                                                          423/594.15
2007/0248883 A1  10/2007 Oda et al.
(Continued)

FOREIGN PATENT DOCUMENTS

EP    3272710 A1    1/2018
EP    3272711 A1    1/2018
(Continued)

OTHER PUBLICATIONS

WO-2014061579-A1 English machine translation (Year: 2023).*
(Continued)

*Primary Examiner* — Armindo Carvalho, Jr.
(74) *Attorney, Agent, or Firm* — Womble Bond Dickinson (US) LLP

(57) ABSTRACT

Provided are a cathode active material for a lithium secondary battery, and a cathode and a lithium secondary battery including the same, the cathode active material including secondary particles including an aggregate of two or more primary particles, and a primary particle coefficient is greater than or equal to 30 $\mu m^{-1}$ and a total circumferential length of the primary particles is greater than or equal to 220 $\mu m$.

10 Claims, 9 Drawing Sheets

(56) References Cited

U.S. PATENT DOCUMENTS

| | | | |
|---|---|---|---|
| 2009/0029253 A1* | 1/2009 | Itou | H01M 10/0525 |
| | | | 429/223 |
| 2014/0127572 A1* | 5/2014 | Ozaki | H01M 4/0471 |
| | | | 429/211 |
| 2014/0287312 A1* | 9/2014 | Choi | H01M 4/505 |
| | | | 429/223 |
| 2015/0093580 A1 | 4/2015 | Kobayashi et al. | |
| 2015/0093641 A1 | 4/2015 | Mitsumoto et al. | |
| 2017/0051116 A1 | 2/2017 | Takahashi et al. | |
| 2018/0026265 A1 | 1/2018 | Kajiyama et al. | |
| 2018/0026267 A1 | 1/2018 | Kim et al. | |
| 2018/0026268 A1 | 1/2018 | Kim et al. | |
| 2018/0108940 A1* | 4/2018 | Kwon | C01G 53/50 |
| 2018/0159128 A1 | 6/2018 | Kim et al. | |
| 2019/0115596 A1 | 4/2019 | Kajiyama et al. | |
| 2021/0028453 A1* | 1/2021 | Imanari | H01M 10/0525 |

FOREIGN PATENT DOCUMENTS

| | | | | |
|---|---|---|---|---|
| EP | 3331066 | A1 | 6/2018 | |
| JP | 4260302 | B2 | 4/2009 | |
| JP | 4996117 | B2 | 8/2012 | |
| JP | 2017-188428 | A | 10/2017 | |
| JP | 2018-14325 | A | 1/2018 | |
| JP | 2018-14326 | A | 1/2018 | |
| KR | 10-1391367 | B1 | 5/2014 | |
| KR | 10-2017-0117063 | A | 10/2017 | |
| KR | 10-2018-0010122 | A | 1/2018 | |
| WO | WO-2014061579 | A1 * | 4/2014 | C01G 53/00 |

OTHER PUBLICATIONS

EPO Office Action dated dated Oct. 1, 2021, issued in corresponding European Patent Application No. 19743950.8 (4 pages).
EPO Extended Search Report dated Jan. 31, 2022, for corresponding European Patent Application No. 19743950.8 (12 pages).
Chinese Office action for Application No. 201980010472.6, issued Oct. 10, 2022, 14 pages.
Chinese Office action for Application No. 201980010472.6, issued Mar. 29, 2023, 11 pages.

* cited by examiner

[Figure 1]
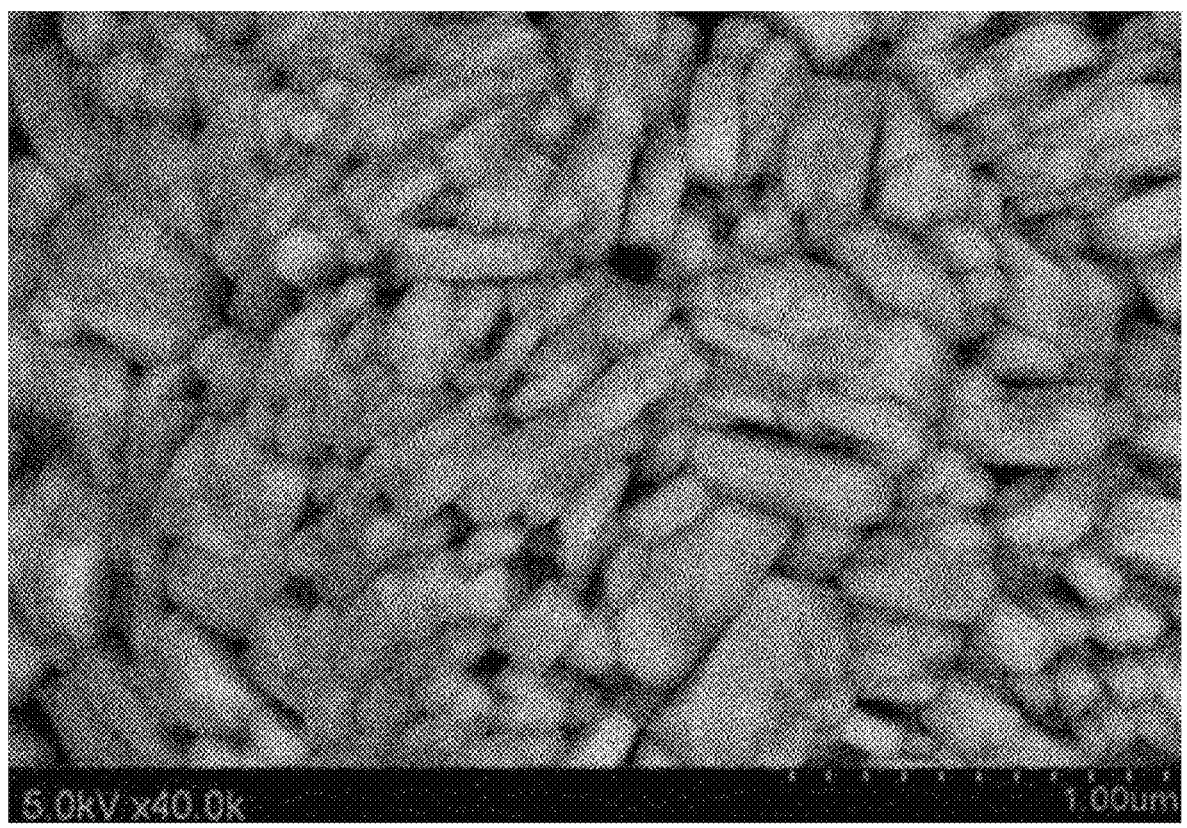

[Figure 2]
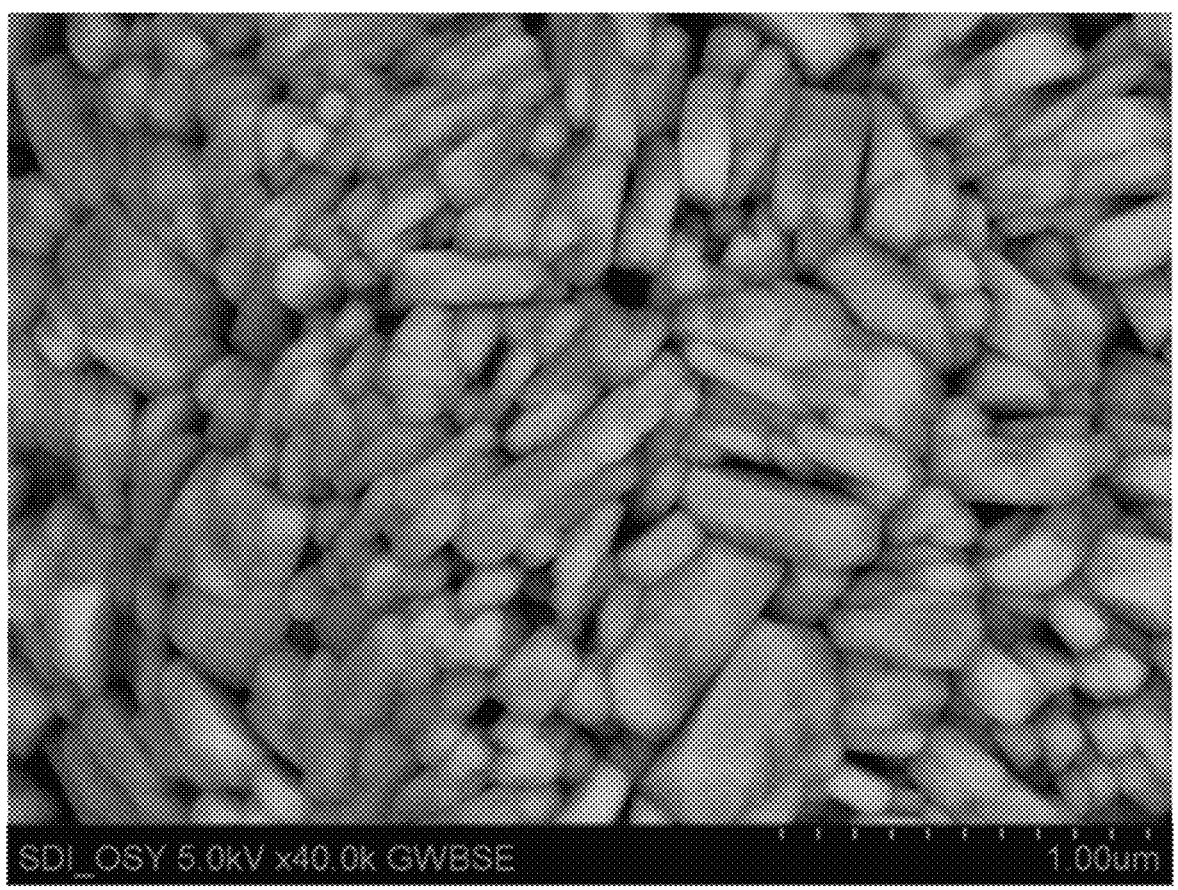

[Figure 3]
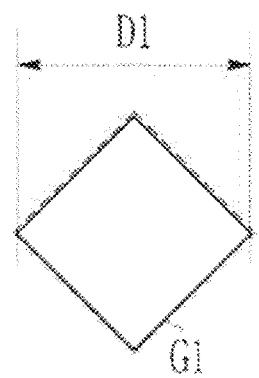 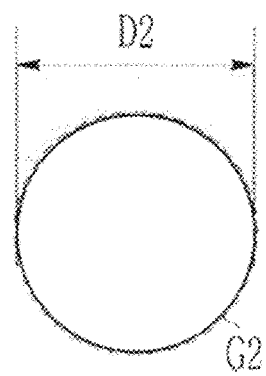 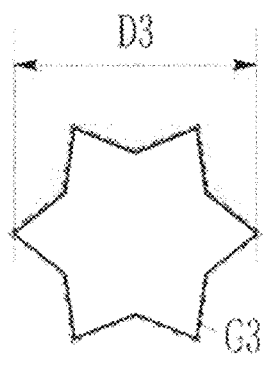
(A)          (B)          (C)
[Figure 4]
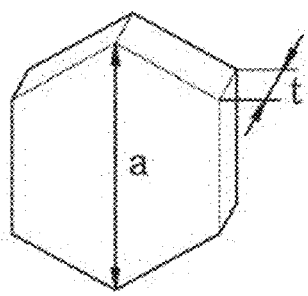 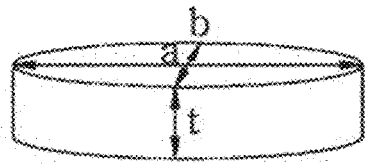 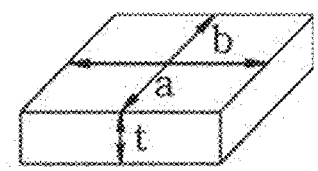
(A)          (B)          (C)

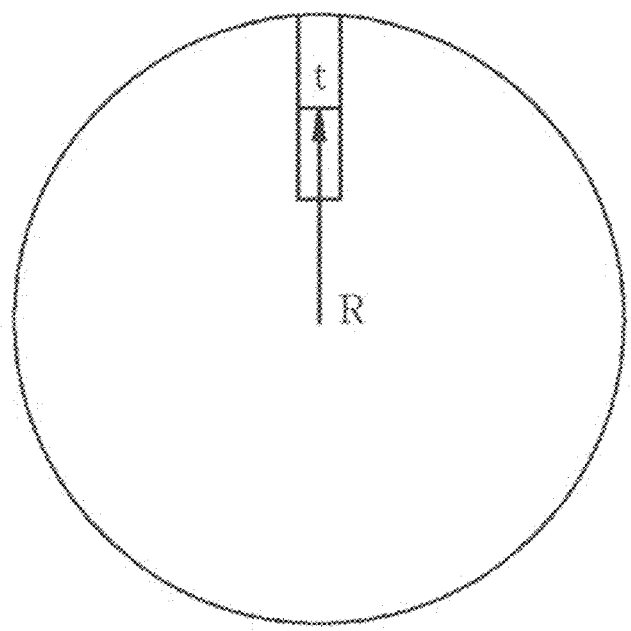
[Figure 5]

[Figure 6]
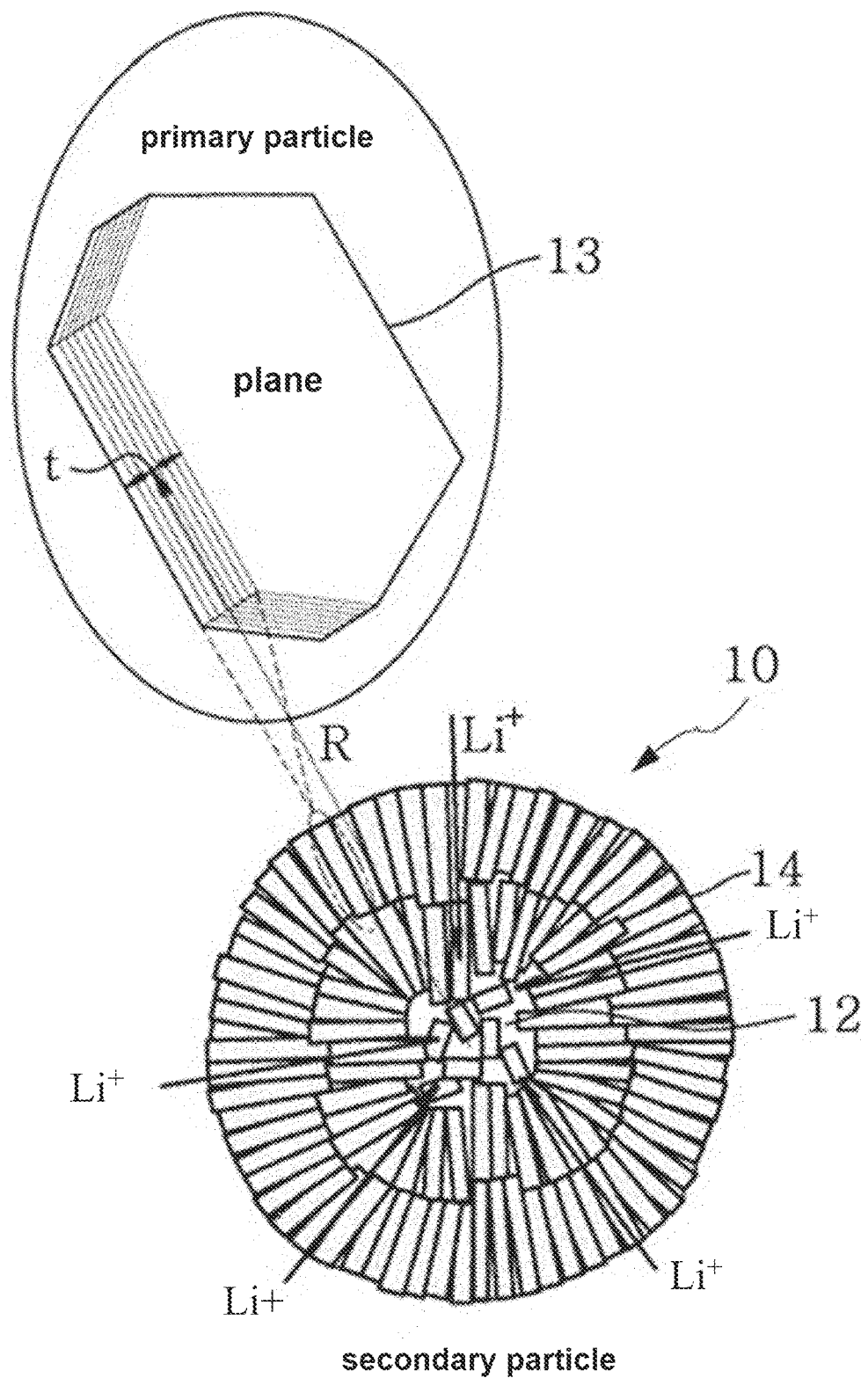

[Figure 7]
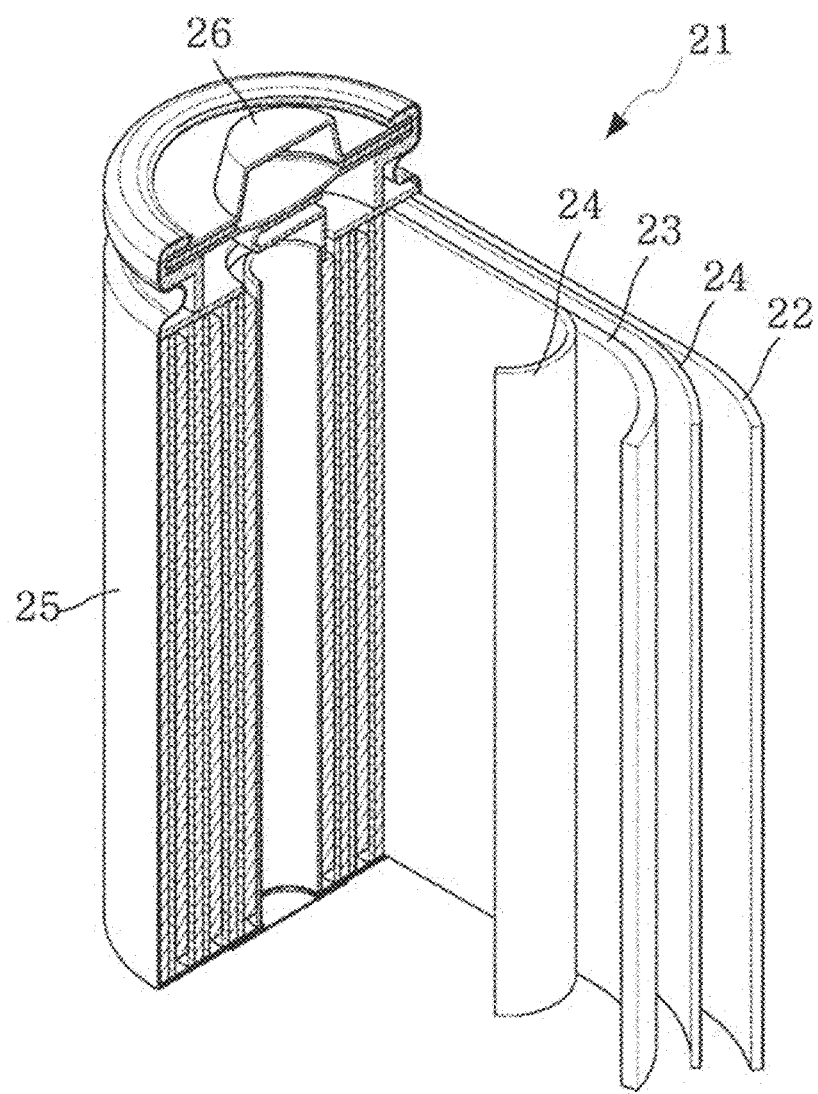

[Figure 8]
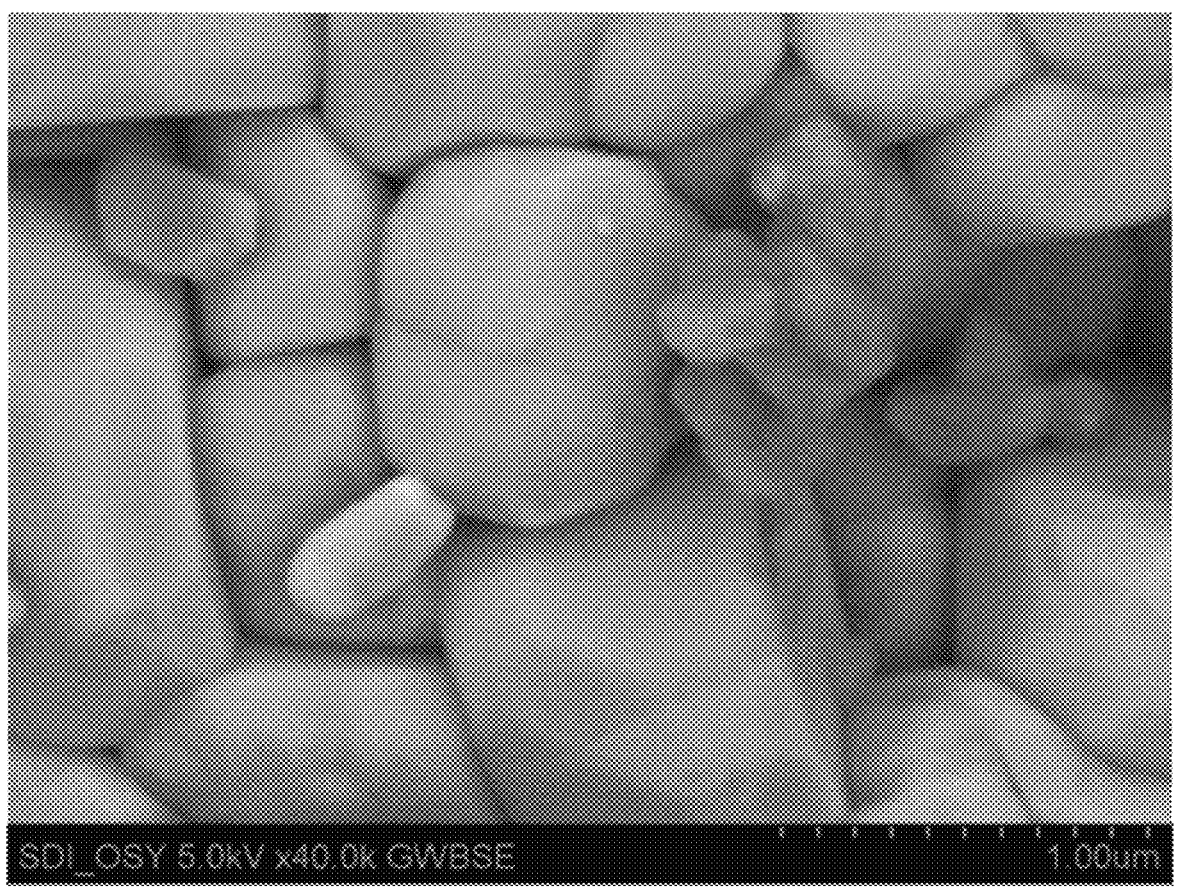

[Figure 9]
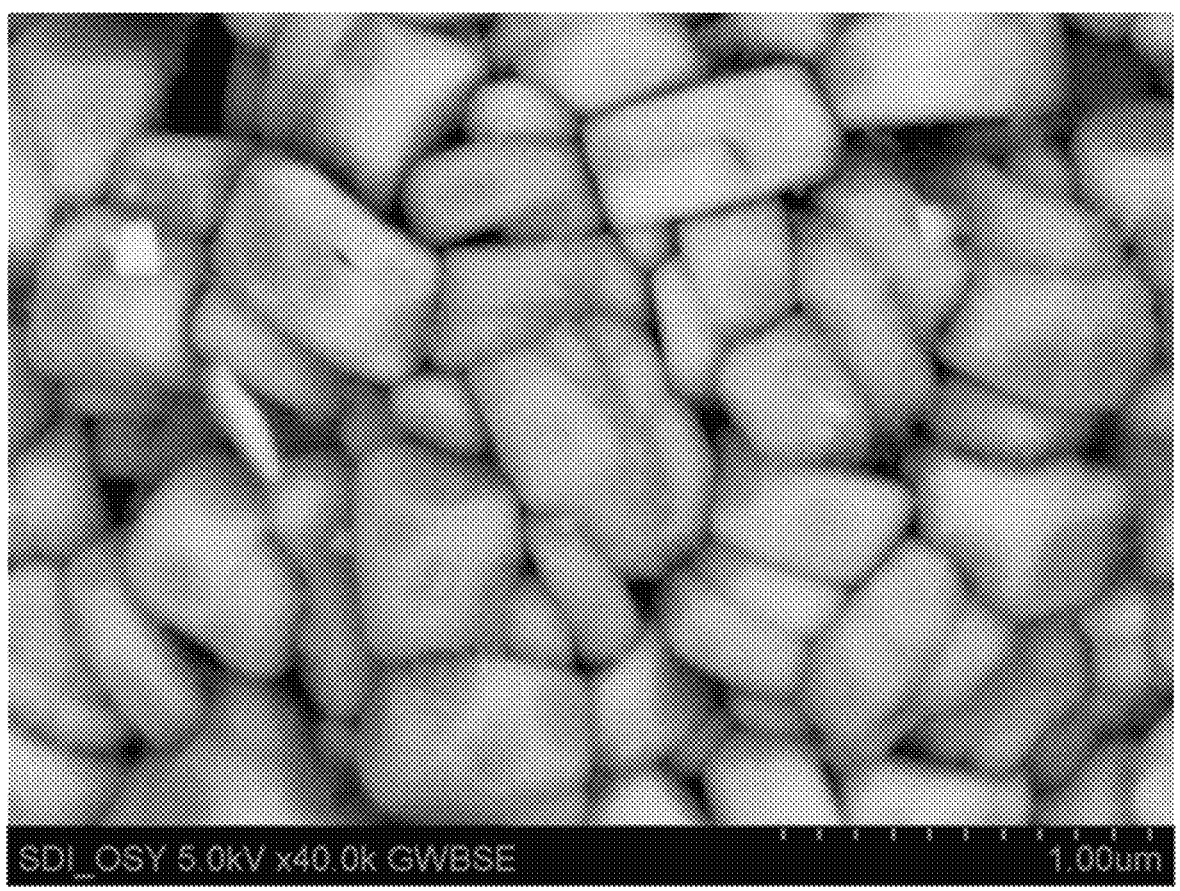

[Figure 10]
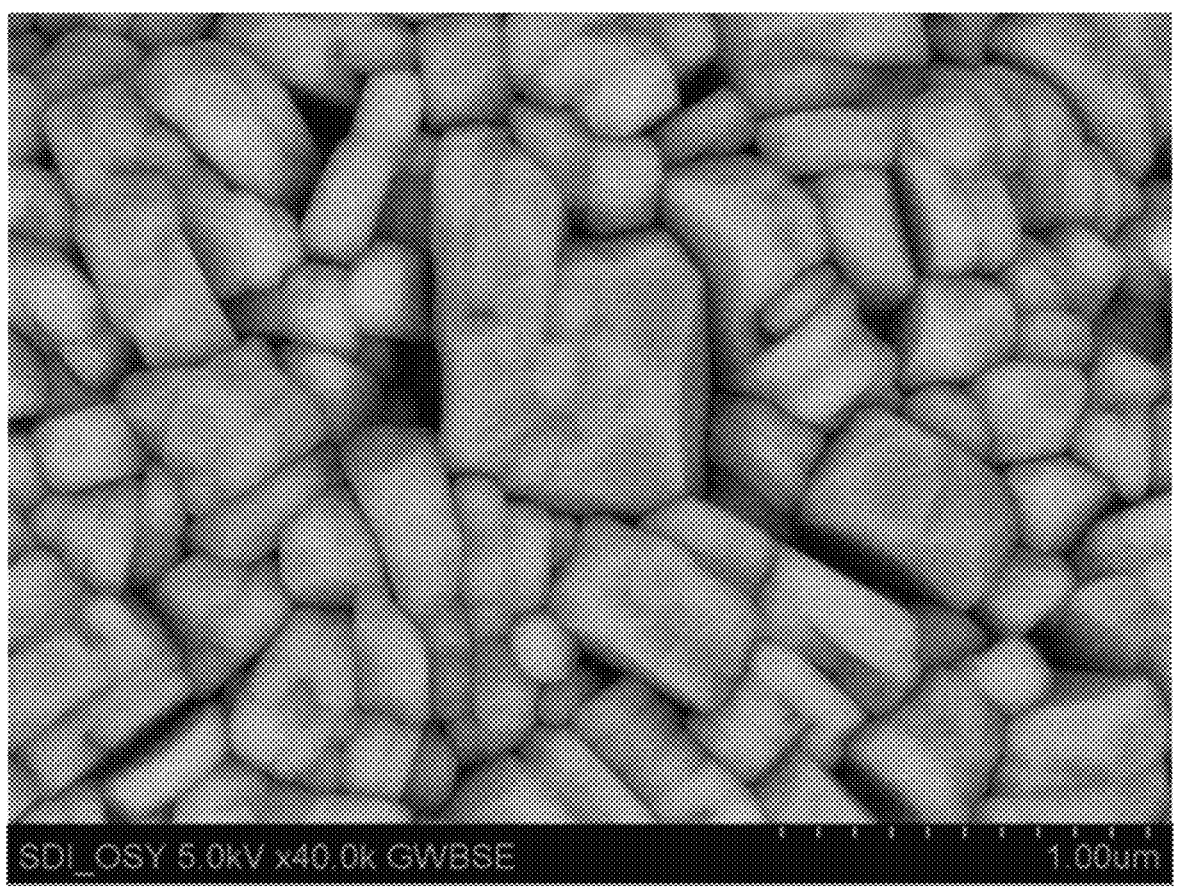

CATHODE ACTIVE MATERIAL FOR LITHIUM SECONDARY BATTERY, CATHODE INCLUDING SAME, AND LITHIUM SECONDARY BATTERY INCLUDING SAME

CROSS-REFERENCE TO RELATED APPLICATION(S)

This application is a National Phase Patent Application of International Patent Application Number PCT/KR2019/000935, filed on Jan. 23, 2019, which claims priority of Korean Patent Application Nos. 10-2018-0010959, filed Jan. 29, 2018 and 10-2019-0008380, filed Jan. 22, 2019. The entire contents of all of which are incorporated herein by reference.

TECHNICAL FIELD

A cathode active material for a lithium secondary battery, and a cathode and a lithium secondary battery including the same are related.

BACKGROUND ART

As portable electronic devices, communication devices, and the like are developed, there are needs for development of a lithium secondary battery having a high energy density.

As the cathode active material of the lithium secondary battery, a lithium nickel manganese cobalt composite oxide, a lithium cobalt oxide, or the like has been used. In the case of using such a cathode active material, due to repeated charging and discharging, cracks generated in the cathode active material may decrease a long-term cycle-life of the lithium secondary battery, increase resistance, and fail to reach a satisfactory level of capacity characteristics, so improvement for these is required.

DISCLOSURE

Technical Problem

A cathode active material for a lithium secondary battery, which easily intercalates/deintercalates lithium ions and has high efficiency by increasing a utilization rate of lithium ions, and a cathode including the same are provided.

In addition, a lithium secondary battery having both improved stability and electrochemical properties due to a cathode including the aforementioned cathode active material is provided.

Technical Solution

According to an embodiment, a cathode active material for a lithium secondary battery includes secondary particles including an aggregate of two or more primary particles, wherein when an average circumferential length of the primary particles per unit area is defined as a primary particle coefficient based on a two-dimensional image measuring the surface of the secondary particles, the primary particle coefficient is greater than or equal to 30 $\mu m^{-1}$, and a total circumferential length of the primary particles based on the two-dimensional image of the surface of the secondary particles is greater than or equal to 220 $\mu m$.

An average size of the primary particles based on a two-dimensional image measuring the surface of the secondary particles may be less than or equal to 1.0 $\mu m$.

An average particle strength of the secondary particles may be greater than or equal to 55 MPa.

At least a portion of the primary particles may have a radial arrangement structure.

The secondary particles may have a radial array structure or may include an internal portion including an irregular porous structure and an external portion including a radial array structure.

The secondary particles may include an external portion having a radial arrangement structure and an internal portion including an irregular porous structure.

An average size of the secondary particles may be 5 $\mu m$ to 30 $\mu m$.

The primary particle may have at least one shape of a plate shape or a needle shape, and at least a portion of the primary particles may have long axes arranged in a radial direction.

The cathode active material for a lithium secondary battery may be represented by Chemical Formula 1.

$$Li_a(Ni_{1-x-y-z}Co_xMn_yM_z)O_2 \qquad \text{[Chemical Formula 1]}$$

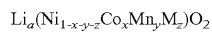

In Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq ((1-x-y-z)$, $y \leq (1-x-y-z)$, $0 < x < 1$, $0 \leq y < 1$, and $0 \leq z < 1$.

Meanwhile, according to another embodiment, a cathode including the aforementioned cathode active material for a lithium secondary battery is provided.

According to another embodiment, a lithium secondary battery including the aforementioned cathode; an anode; and a separator between the cathode and the anode is provided.

Advantageous Effects

It is possible to provide a cathode active material for a lithium secondary battery, which is easy to intercalate/deintercalate lithium ions, has a low resistance between particles, and has high efficiency by increasing a utilization rate of lithium ions, and a cathode including the same.

In addition, it is possible to provide a lithium secondary battery having both improved stability and electrochemical characteristics by having the cathode including the aforementioned cathode active material.

DESCRIPTION OF THE DRAWINGS

FIG. 1 shows a two-dimensional image of the surface of the secondary particles according to an embodiment, FIG. 2 is a view in which boundary lines between primary particles and between pores are respectively highlighted in the two-dimensional image of FIG. 1, FIG. 3 is a view for explaining a difference between the primary particle circumferential length and the primary particle size according to an embodiment, FIG. 4 is a schematic view showing three-dimensional shapes of the primary particles according to an embodiment, FIG. 5 is a view for explaining a definition of the radial shape in the cathode active material secondary particles according to an embodiment, FIG. 6 is a schematic view showing a cross-sectional structure of a cathode active material for a lithium secondary battery according to an embodiment, FIG. 7 schematically shows a structure of a lithium secondary battery having a cathode including a cathode active material according to an embodiment, and FIGS. 8 to 10 are views in which boundary lines between the primary particles and the pores are respectively highlighted in the two-dimensional image measuring the surface of the secondary particles according to Comparative Examples 1 to 3.

MODE FOR INVENTION

The present disclosure will be described more fully hereinafter with reference to the accompanying drawings, in which example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In many embodiments, elements having the same structure are represented by the same reference numerals and are described in the represented embodiment, and only the different structures will be described in the other embodiments.

In an embodiment, for sizes or particle diameters of various particles, although they may be numerized by a measurement to show an average size of a group, the generally used method includes a mode diameter showing the maximum value of the distribution, a median diameter corresponding to the center value of integral distribution curve, a variety of average diameters (numeral average, length average, area average, mass average, volume average, etc.), and the like. Unless particularly mentioning otherwise, average sizes or average particle diameters means to numeral average sizes or numeral average diameters in the present disclosure, and it is obtained by measuring D50 (particle diameters at a position of distribution rate of 50%).

In an embodiment, the two-dimensional image refers to an image obtained by measuring an object to be measured using a scanning electron microscope (SEM) and unless otherwise specified in the specification, the measurement portion of the object is enlarged by a magnification of about 20,000 times or more. However, the measurement magnification of the two-dimensional image is not necessarily limited thereto. That is, since there are some differences in the magnification depending on measurement devices, the measurement magnification may be set within an appropriate magnification range that may define sizes of the primary particles, and in one embodiment, the analysis result of the two-dimensional image (primary particle coefficient, etc.) may be measured within the same or similar range even if the measurement magnification is different. For example, the measurement magnification of the two-dimensional image according to an embodiment may be a magnification where the primary particles are identified to have a predetermined size on the two-dimensional image, for example, a magnification of greater than or equal to 20,000 times.

In addition, the two-dimensional image in an embodiment all includes an image two-dimensionally exhibited by measuring the outer surface of an object without processing/deforming the object and an image two-dimensionally exhibited by cutting any cut surface of the object and thus measuring the cross section of the object.

Hereinafter, a cathode active material for a lithium secondary battery according to an embodiment is described with reference to FIGS. 1 and 2.

FIG. 1 shows a two-dimensional image of the surface of a secondary particle of a portion of the cathode active material according to an embodiment, and FIG. 2 is a view in which boundary lines between primary particles and between pores are respectively highlighted in the two-dimensional image of FIG. 1.

Recently, a lithium nickel cobalt manganese composite oxide, a lithium cobalt oxide, and the like have been used as a cathode active material for a lithium secondary battery. Among them, for example, in the case of the lithium nickel cobalt manganese composite oxide, it is necessary to increase a nickel content in order to improve capacity characteristics of the conventional cathode active material. However, when the nickel content is increased, irreversible reactions such as cation mixing, in which nickel is substituted in a portion of the lithium element, are likely to occur, and unreacted lithium is increased on the surface during synthesis, resulting in side reactions that generate gas. Therefore, when the cathode and the lithium secondary battery are produced using these cathode active materials, safety of the prepared cathode and the lithium secondary battery may be deteriorated. Accordingly, the present inventors intend to solve the aforementioned problems of the cathode active material and provide a cathode active material having excellent stability and electrochemical properties.

Referring to FIG. 1, a cathode active material for a lithium secondary battery according to an embodiment includes secondary particles including aggregates of two or more primary particles. That is, the secondary particles may be aggregates of the primary particles formed by two or more primary particles, as shown in FIG. 1.

The primary particle coefficient of the cathode active material for a lithium secondary battery according to the present embodiment may be greater than or equal to 30 $\mu m^{-1}$, for example greater than or equal to 35 $\mu m^{-1}$, for example greater than or equal to 40 $\mu m^{-1}$, for example greater than or equal to 60 $\mu m^{-1}$, for example less than or equal to 55 $\mu m^{-1}$, for example less than or equal to 50 $\mu m^{-1}$. Specifically, the primary particle coefficient may be greater than or equal to 30 $\mu m^{-1}$ and less than or equal to 60 $\mu m^{-1}$ and more specifically, greater than or equal to 35 $\mu m^{-1}$ and less than or equal to 55 $\mu m^{-1}$.

A total circumferential length of the primary particles of the cathode active material for a lithium secondary battery according to the present embodiment may be greater than or equal to 200 μm, for example greater than or equal to 210 μm, for example greater than or equal to 220 μm, for example greater than or equal to 230 μm, for example greater than or equal to 240 μm, for example greater than or equal to 250 μm, for example greater than or equal to 260 μm, for example greater than or equal to 270 μm, for example greater than or equal to 280 μm, or for example greater than or equal to 290 μm, and for example less than or equal to 450 μm, for example less than or equal to 440 μm, for example less than or equal to 430 μm, for example less than or equal to 420 μm, for example less than or equal to 410 μm, for example less than or equal to 400 μm, for example less than or equal to 390 μm, for example less than or equal to 380 μm, for example less than or equal to 370 μm, for example less than or equal to 360 μm, or for example less than or equal to 350 μm in a secondary particle region having a predetermined area. It may be specifically, greater than or equal to 200 μm and less than or equal to 450 μm, and more specifically greater than or equal to 250 μm and less than or equal to 400 μm.

In the secondary particle region, the predetermined area may be greater than or equal to 3 $\mu m^2$, for example greater than or equal to 4 $\mu m^2$, for example greater than or equal to 5 $\mu m^2$, or for example greater than or equal to 6 $\mu m^2$, and for example less than or equal to 9 µm², for example less than or equal to 8 µm², or for example less than or equal to 7 µm². It may be specifically, greater than or equal to 3 µm² and less than or equal to 9 µm² and more specifically greater than or equal to 4 µm² and less than or equal to 8 µm².

In the secondary particle region having the primary particle coefficient and the predetermined area, when the total circumferential length of the two-dimensional image satisfies the ranges, the secondary particle surfaces densely packed while having a large contact area may be provided.

When a cathode active material includes secondary particles, efficiency and lithium ion-intercalating/deintercalating characteristics of the cathode active material depend on a material, a shape, a size, and the like of primary particles. In the cathode active material according to an embodiment, lithium ions generated on the boundary surfaces of the primary particles forming the secondary particles may be easily intercalated/deintercalated by controlling a size, a contact area, and density of the primary particles. In addition, a specific composition (e.g., a nickel content in a lithium nickel cobalt manganese composite oxide) is not increased, but the size, contact area, and/or density of the primary particles may be controlled to provide the cathode active material for a lithium secondary battery having excellent stability and electrochemical characteristics.

In this way, the contact area and density of the primary particles disposed on the surface of the secondary particles are defined by using a primary particle coefficient. In an embodiment, the primary particle coefficient, by referring to an image of measuring the two-dimensional surfaces of the secondary particles as shown in FIG. 1, means an average circumferential length of the primary particles per unit area. Specifically, boundary lengths of the primary particles are all added to obtain the total circumferential length, and the total circumferential length may be divided by an area of the two-dimensional image to calculate the primary particle coefficient.

In the present specification, a circumferential length (perimeter) of the primary particles is obtained by setting a predetermined region where any one primary particle takes in the two-dimensional image (e.g., FIG. 1), connecting the boundary lines of the predetermined region to make it into a closed shape, and measuring lengths of the boundary lines.

Hereinafter, examples of a method of measuring the primary particle coefficient and the circumferential length of the primary particle are described in more detail with reference to FIGS. 1 and 2.

In an embodiment, the two-dimensional image shown in FIG. 1 may be processed into a shape image shown in FIG. 2 by using an image analysis program (JNOptic Leopard iXG). For example, when the image analysis program is used, as shown in FIG. 2, to measure the total numbers of the primary particles and pores and in addition, to respectively set boundary lines of the primary particles and the pores and boldly marking the boundary lines. Referring to FIG. 2, in the two-dimensional image of FIG. 1, the boundary lines of the primary particles and the pores are respectively marked as white. Out of the marked boundary lines, the sum of the circumferential lengths of the primary particles is the total circumferential length of the primary particles. In an embodiment, the total circumferential length of the primary particles may help indirectly grasping density of the primary particles in the two-dimensional image.

In an embodiment, the boundary lengths of the primary particles which are analyzed in FIG. 2 are all added to obtain the total circumferential length thereof, and the obtained total circumferential length is divided by a total area of the two-dimensional image (e.g., since the two-dimensional image of FIG. 1 is 40,000 times magnified, when converted into an actual length, the two-dimensional image has a size of a width of 3.12 µm and a length of 2.18 µm. Accordingly, an actual area of the two-dimensional image may be obtained by the width×the length) to obtain the primary particle coefficient.

On the other hand, in an embodiment, an average circumferential length of any one primary particle of the primary particles is regarded as an average circumferential length. The average circumferential length may be obtained by adding boundary lengths of the primary particles in the predetermined region of FIG. 2 to obtain a total circumferential length and then, dividing the total number of the primary particles in the region.

Hereinafter, a cathode active material for a secondary battery according to another embodiment of the present invention is described with reference to FIG. 3. Since the cathode active material according to the present embodiment has substantially the same configuration as the cathode active material according to the embodiment of the present invention, except for the size of the primary particles, the following descriptions focus on the size of the primary particles. Detailed description of the substantially identical constituent elements will be omitted.

The average size of the primary particles according to the present embodiment may be for example greater than or equal to 0.1 µm, for example greater than or equal to 0.2 µm, for example greater than or equal to 0.3 µm, or for example greater than or equal to 0.4 µm, and for example less than or equal to 1.5 µm, for example less than or equal to 1.4 µm, for example less than or equal to 1.3 µm, for example less than or equal to 1.2 µm, for example less than or equal to 1.1 µm, for example less than or equal to 1.0 µm, for example less than or equal to 0.9 µm, for example less than or equal to 0.8 µm, for example less than or equal to 0.7 µm, or for example less than or equal to 0.6 µm, based on a two-dimensional image measuring the surface of the secondary particles. It may be specifically greater than or equal to 0.1 µm and less than or equal to 1.5 µm, and more specifically greater than or equal to 0.1 µm and less than or equal to 1.0 µm.

The secondary particles according to the present embodiment may much facilitate intercalation/deintercalation of lithium ions on the boundary surfaces of the primary particles by controlling the primary particles to have small predetermined sizes. In addition, an area and/or volume per one particle of the primary particles may be reduced to decrease a required lithium-moving distance in each primary particle and thus increase a lithium utilization rate depending on a cycle rate, a total volume of secondary particles obtained as aggregates thereof may be increased compared with that of a composite oxide having the same nickel composition, and accordingly, electrochemical characteristics may be improved without a side reaction.

Hereinafter, a difference between the primary particle circumferential length and the primary particle size is described in detail with reference to FIG. 3. The primary particle size denotes a maximum length of a straight line of any two points on the boundary lines of the primary particle in the two-dimensional image, and accordingly, when the primary particle has a circle shape, it is a diameter, and when the primary particle has an oval shape, it is a length of a long axis. For example, assuming that the primary particle has, as shown in FIG. 3, (A) a rhombus shape, (B) a circular shape, and (C) a star shape, each primary particle has the same size (D1=D2=D3), but circumferential lengths of the primary particles may be different one another (G1≠G2≠G3).

On the other hand, since lithium ions are intercalated/deintercalated on the boundary surfaces of the neighboring primary particles, as circumferential lengths of the primary particles increase, the intercalation/deintercalation of the lithium ions may be further facilitated. Accordingly, considering this, even though the primary particles have the same size, (C) the star shape having a longer circumferential length may be much advantageous in terms of intercalation/deintercalation compared with (A) the rhombus shape or (B) the circular shape.

In addition, as not shown in FIG. 3, primary particles having the same circumferential length but a smaller size, compared with primary particles having the same circumferential length but a larger size, may have a large contact area with other primary particles and be densely disposed.

On the other hand, the secondary particles in the cathode active material according to an embodiment have relatively smaller primary particles but a larger contact area and/or higher density of the primary particles and thus excellent physical/mechanical stability.

Hereinafter, a cathode active material according to another embodiment of the present invention is described. The cathode active material according to the present embodiment has the substantially same configuration as the cathode active material according to the embodiment of the present invention except for average particle strength, and hereinafter, particle strength is mainly described. The substantially same configuration as that of the embodiment of the present invention is not illustrated in detail.

In the present embodiment, a method of measuring average particle strength of the secondary particles may, for example, use a particle strength-measuring instrument (Micro compression testing machine, MCT-W500-E, Shimadzu Corp.). In more detail, when a cone-type flat indenter having a diameter of 50 μm is used to press the secondary particles with a pressure of 100 mN, a pressure where the secondary particles are broken is measured, which is several times repeated and averaged to obtain average particle strength of the aforementioned secondary particles.

An average particle strength of the secondary particle according to the present embodiment may be greater than or equal to 55 MPa, for example greater than or equal to 60 MPa, for example greater than or equal to 65 MPa, for example greater than or equal to 70 MPa, or for example greater than or equal to 75 MPa, and for example less than or equal to 110 MPa, for example less than or equal to 105 MPa, for example less than or equal to 100 MPa, for example less than or equal to 95 MPa, or for example less than or equal to 90 MPa. It may be specifically greater than or equal to 55 MPa and less than or equal to 110 MPa, and more specifically greater than or equal to 70 MPa and less than or equal to 100 MPa.

When the average particle strength of the secondary particles according to an embodiment satisfies the aforementioned range, the secondary particles have improved physical/mechanical stability, and thus, stability against external physical/mechanical impact is improved.

Hereinafter, a cathode active material for a secondary battery according to another embodiment of the present invention is described with reference to FIGS. 4 to 6. FIG. 4 is a schematic view showing the shape of the primary particles of the cathode active material according to the present embodiment, FIG. 5 is a view for explaining the definition of the radial in the cathode active material secondary particles according to an embodiment, and FIG. 6 is a schematic view showing a cross-sectional structure of the cathode active material for a lithium secondary battery according to an embodiment.

The cathode active material according to the present embodiment may include secondary particles including at least a portion of primary particles having a radial arrangement structure.

In the present embodiment, at least a portion of the primary particles constituting the aggregate may have a three-dimensional shape of a plate shape or a needle shape. The primary particles may be formed to have a thickness smaller than a long axis length (plane direction). Herein, the long axis length may mean a maximum length based on the largest surface of the primary particle. That is, the primary particles may have a structure in which the length (t) in one axial direction (i.e., thickness direction) is smaller than the long axis length (a) in the other direction (i.e., plane direction).

Referring to FIG. 4, the primary particles according to an embodiment have a basic plate shape, for example, (A) a polygonal nanoplate shape such as hexagonal shape, (B) a nano disc shape, (C) a rectangular parallelepiped shape, and also have various detailed shapes. On the other hand, a thickness t of the primary particles may be shorter than lengths a and b in a plane direction of the primary particles. The length a in the plane direction may be longer than or the same as the length b. In an embodiment, a direction that the thickness t of the primary particles is defined is defined as a thickness direction, and the direction that the lengths a and b are defined is defined as a plane direction.

In an embodiment, the "radially" arranged structure, as shown in FIG. 5, means that the primary particles are arranged with their thicknesses t vertical or vertical±5° C. with a radial direction (R) toward the centers of the secondary particles.

The cathode active material according to an embodiment may have irregular porous pores therein. The "irregular porous structure" refers to a structure where pore sizes and shapes are not regular and do not have uniformity. The internal portion of the irregular porous structure includes primary particles like the external portion thereof. The primary particles disposed in the internal portion may be arranged without regularity unlike the primary particles in the external portion.

Here, "external portion" refers to a region in the range of 30 length % to 50 length %, for example 40 length % from the outermost surface of the total distance from the center to the surface of the nickel-based compound or a region within 2 μm from the outermost of the cathode active material. The "internal portion" refers to a region in the range of 50 length % to 70 length %, for example 60 length % from the center of the total distance from the center to the surface of the nickel-based compound or a remaining region excluding the region within 2 μm from the outermost of the cathode active material.

On the other hand, the secondary particle according to an embodiment may have an open pore having a size of less than 150 nm, for example 10 nm to 148 nm toward the center of the internal portion. The open pore is an exposed pore through which an electrolytic solution flows in and out. According to an embodiment, the open pore may be formed to a depth of less than or equal to 150 nm, for example 0.001 nm to 100 nm, or for example 1 nm to 50 nm on average from the surface of the cathode active material secondary particles.

The cathode active material according to an embodiment may include two or more primary particles, and the long axes of the primary particles may be arranged in a radial direction to form secondary particles.

On the other hand, the primary particles composed of the external portion and the internal portion have an average length ranging from 150 nm to 500 nm, for example, 200 nm to 380 nm, and specifically, 290 nm to 360 nm. The average length of the primary particles denotes an average length of an average long axis length and an average short axis length in the plane direction of the primary particles, and when the primary particles have a spherical shape, the average length thereof denotes an average particle diameter. The average thickness of the primary particles composed of the external portion and the internal portion may be in a range of 100 nm to 200 nm, for example, 120 nm to 180 nm, and specifically, 130 nm to 150 nm.

The average thickness and the average length may have a ratio of 1:2 to 1:10, for example, 1:2.1 to 1:5, and specifically, 1:2.3 to 1:2.9.

In this way, when the average lengths, the average thicknesses, and the ratios between the average thickness and the average length satisfy the aforementioned ranges, relatively large lithium diffusion paths between many grain boundaries at the surface and many crystal surfaces capable of transferring lithium to the external portion are exposed, and thereby lithium diffusivity are improved, a utilization rate of lithium ions increases, and thus high initial efficiency and capacity may be ensured, when sizes of the primary particles are small and the primary particles are radially arranged in the external portion.

Also, when the primary particles are arranged radially, the pores exposed from the surface between them are directed toward the center direction to promote lithium diffusion from the surface. When lithium is deintercalated and/or intercalated into the radially arranged primary particles, uniform shrinkage and expansion may be enable, pores are present in a (001) direction in which particles are expanded when lithium deintercalated and alleviate the expansion. Probability of occurrence of cracks during shrinkage and expansion may be lowered due to small sizes of plate-shaped or needle-shaped primary particles, pores in the internal portion may additionally alleviate the volume changes, thereby decreasing the cracks generated between the primary particles during charging and discharging and improving cycle-life characteristics, and reducing a resistance increase.

Closed pores may be present in the internal portion of the cathode active material and closed pores and/or open pores may be present in the external portion thereof. The closed pores are difficult to include an electrolyte while the open pores may include an electrolyte therein. In the present specification, the closed pores may be independent pores formed by closing the wall surfaces of the pores and are not connected to other pores and the open pores may be formed as continuous pores connected to the outside of the particles by forming at least one portion of the wall surfaces of the pores to be an open structure.

The cathode active material according to an embodiment may minimize a direct contact between the cracked surface and the electrolytic solution even if cracks are generated, and thus an increase of a surface resistance is suppressed. Referring to FIG. 6, a nickel-based compound 10 includes an external portion 14 where primary particles 13 having at least either one shape of a plate shape and a needle shape are arranged in a radial direction and an internal portion 12 where the primary particles are irregularly arranged.

On the other hand, in the internal portion 12, empty spaces among the primary particles are more than that of the external portion. A pore size and porosity in the internal portion are large and irregular compared with those in the external portion. The arrow in FIG. 6 shows the direction of movement of lithium ions.

When an active material is discharged, a lithium diffusion speed is deteriorated at the end of the discharge, and when cathode active material secondary particles have a large size, discharge capacity relative to charge capacity is small due to resistance against lithium permeated into the internal portion of the cathode active material secondary particles, and accordingly, charge and discharge efficiency may be deteriorated. However, since the cathode active material secondary particles according to an embodiment have a porous structure in the internal portion, there is an effect of reducing a diffusion distance to the internal portion, and in the external portion, since the primary particles are arranged in a radial direction toward the surface, lithium may be easily intercalated into the surface. The cathode active material primary particles have a small size and thus may easily secure a lithium-passing path among the particles. The primary particles have a small size and pores among themselves, which may ease a volume change during the charge and discharge and thus minimize a stress due to a volume change during the charge and discharge.

The cathode active material according to an embodiment may include radial primary particles and non-radial primary particles. An amount of the non-radial primary particles may be less than or equal to 20 wt %, for example 0.01 wt % to 10 wt %, specifically 0.1 wt % to 5 wt % based on a total weight, 100 parts by weight of the radial primary particles and non-radial primary particles. When the non-radial primary particles are included in the amount range other than the radial primary particles in the cathode active material, a lithium secondary battery having improved cycle-life characteristics due to easy diffusion of lithium may be produced.

On the other hand, an average size of the secondary particles may be, for example greater than or equal to 3 μm, for example greater than or equal to 4 μm, for example greater than or equal to 5 μm, for example greater than or equal to 6 μm, for example greater than or equal to 7 μm, for example greater than or equal to 8 μm, for example greater than or equal to 9 μm, or for example greater than or equal to 10 μm and for example less than or equal to 30 μm, for example less than or equal to 25 μm, for example less than or equal to 20 μm, for example less than or equal to 19 μm, for example less than or equal to 18 μm, for example less than or equal to 17 μm, for example less than or equal to 16 μm, or for example less than or equal to 15 μm. In may be specifically greater than or equal to 3 μm and less than or equal to 30 μm, more specifically greater than or equal to 7 μm and less than or equal to 20 μm, and even more specifically greater than or equal to 8 μm and less than or equal to 15 μm. When the secondary particles are spherical, the average size refers to the average diameter. If the secondary particles are oval, rod, etc., the average size refers to the average length of the long axis.

Meanwhile, the cathode active material may be an active material represented by Chemical Formula 1.

$$Li_a(Ni_{1-x-y-z}Co_xMn_yM_z)O_2 \qquad \text{[Chemical Formula 1]}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0 < x < 1$, $0 \leq y < 1$, and $0 \leq z < 1$.

In this way, in the cathode active material such as Chemical Formula 1, a nickel content may be greater than a cobalt content, and a nickel content may be greater than a manganese content.

In Chemical Formula 1, $0.95 \le a \le 1.3$, for example $1.0 \le a \le 1.1$, $0 < x \le 0.33$, or $0.1 \le a \le 0.33$, $0 \le y \le 0.5$, for example $0.05 \le y \le 0.3$, $0 \le z \le 0.05$, and $0.33 \le (1-x-y-z) \le 0.95$, for example $0.33 \le (1-x-y-z) \le 0.95$.

For example, in Chemical Formula 1, $0 \le z \le 0.05$, $0 < x \le 0.33$, and $0 \le y \le 0.33$.

According to an embodiment, in Chemical Formula 1, z may be 0.

In the cathode active material, the nickel content may be larger than each transition metal content based on total 1 mole of transition metals.

For example, the cathode active material according to an embodiment may satisfy $(1-x-y-z) \ge 0.4$, for example, $(1-x-y-z) \ge 0.5$, or for example, $(1-x-y-z) \ge 0.6]$ in Chemical Formula 1. However, the embodiment is not necessarily limited thereto. According to an embodiment, nickel may be included in an amount of less than 40 mol % based on total mols of cobalt, manganese, and additional M.

In this way, the cathode active material according to an embodiment may not be greatly limited by the internal portion nickel content. Accordingly, an embodiment may prevent cation mixing, a side reaction, and the like, which may occur when the internal portion nickel content is excessively increased, and thus provide a cathode active material for a lithium secondary battery having excellent electrochemical characteristics and stability by controlling a size, a contact area, and density of the primary particles without increasing the nickel content as described aforementioned.

Hereinafter, a method of producing the cathode active material according to the aforementioned embodiment is described.

As for the method of producing the cathode active material according to an embodiment, a precursor mixture is prepared by mixing raw materials. In an embodiment, the raw materials corresponding to Chemical Formula 1, which are a nickel precursor, a cobalt precursor, a manganese precursor, and optionally, a metal (M) precursor, are mixed with a solvent to obtain the precursor mixture.

Contents of the nickel precursor, the cobalt precursor, the manganese precursor, and the metal precursor are stoichiometrically controlled to obtain a compound of Chemical Formula 1.

The solvent may include water, ethanol, propanol, butanol, and the like.

To the precursor mixture, a precipitating agent and a pH controlling agent are added to control pH of the mixture and then, perform a co-precipitation reaction and thus obtain precipitates. The pH of the mixture is, for example, controlled within a range of 10 to 13.

The precipitating agent serves to control a rate of formation of the precipitate in the co-precipitation reaction, and includes ammonium hydroxide ($NH_4OH$), citric acid, and the like. The content of the precipitating agent is used at a conventional level.

The pH controlling agent serves to adjust the pH of the reaction mixture, and examples thereof include ammonium hydroxide, sodium hydroxide (NaOH), sodium carbonate ($Na_2CO_3$), and sodium oxalate ($Na_2C_2O_4$).

The nickel precursor may include, for example, nickel sulfate, nickel chloride, or nickel nitrate, the cobalt precursor may include, for example, cobalt sulfate, cobalt chloride, or cobalt nitrate, and the manganese precursor may include, for example, manganese sulfate, manganese nitrate, manganese chloride, and the like. The metal (M) precursor may include, for example, metal carbonate, metal sulfate, metal nitrate, metal chloride, and the like.

Subsequently, the obtained precipitates are washed, filtered, and dried at about 20° C. to about 160° C. to obtain composite metal hydroxide ($Ni_{0.6}Co_{0.2}Mn_{0.2}(OH)_2$) powder. The precipitate drying may use a hot air oven but is not limited thereto.

The obtained composite metal hydroxide powder may have an external portion 14 having a structure that primary particles having at least either one shape of a plate shape and a needle shape are arranged in a radial direction and an internal portion having a structure that primary particles are irregularly arranged.

Subsequently, the obtained composite metal hydroxide powder is mixed with a lithium-based material and then, heat-treated to prepare a cathode active material according to the aforementioned embodiment.

The lithium-based material is a lithium source for the cathode active material according to an embodiment to function as the cathode active material. A type of the lithium-based material according to an embodiment is not particularly limited but may include, for example, $Li_2CO_3$, LiOH, a hydrate thereof, or a combination thereof.

The composite metal hydroxide powder and the lithium-based material may be mixed through manual mixing, automatic mixing using a mixer or a stirrer.

The heat treatment may be performed under an oxidizing gas atmosphere. The oxidizing gas atmosphere may use oxidizing gas such as oxygen or air. The heat treatment may be, for example, performed at greater than or equal to 700° C. and less than 820° C., for example, greater than or equal to 750° C. and less than or equal to 800° C.

The heat treatment time, depending on the heat treatment temperature and the like, may be, for example, 2 hours, for example, greater than or equal to 3 hours, for example, greater than or equal to 4 hours, or for example greater than or equal to 5 hours and for example, less than or equal to 10 hours, for example, less than or equal to 9 hours, for example, less than or equal to 8 hours, or for example, less than or equal to 7 hours.

The time and/or temperature conditions are used to heat-treat the mixture of the composite metal hydroxide powder and the lithium-based material and thus prepare a cathode active material satisfying the primary particle coefficient range and/or the primary particle total circumferential length range.

Hereinafter, a structure and a producing method of a lithium secondary battery having the cathode including the cathode active material according to an embodiment is described with reference to FIG. 7.

FIG. 7 schematically shows a structure of a lithium secondary battery having a cathode including the cathode active material according to an embodiment.

The lithium secondary battery 21 according to FIG. 7 includes a cathode 23 including the cathode active material according to an embodiment, an anode 22, and a separator 24.

The cathode 23 and the anode 22 may be produced by coating a composition for forming a cathode active material layer or a composition for forming an anode active material layer on each current collector, respectively, and drying the same.

The composition for the cathode active material may be prepared by mixing a cathode active material, a conductive agent, a binder, and a solvent, wherein the cathode active material is the cathode active material represented by Chemical Formula 1.

The binder may help binding of active materials, conductive agent, and the like and binding them on a current collector, and may be added in an amount of 1 to 5 parts by weight based on a total weight, 100 parts by weight of the cathode active material. Non-limiting examples of such a binder may be polyvinylidene fluoride, polyvinyl alcohol, carboxymethyl cellulose (CMC), starch, hydroxypropyl cellulose, recycled cellulose, polyvinylpyrrolidone, tetrafluoroethylene, polyethylene, polypropylene, an ethylene-propylene-diene terpolymer (EPDM), sulfonated EPDM, a styrene butadiene rubber, a fluorine rubber, various copolymers, and the like. The amount thereof may be 2 to 5 parts by weight based on a total weight, 100 parts by weight of the cathode active material. When the amount of the binder is within the range, the binding force of the active material layer to the current collector is good.

The conductive agent is not particularly limited as long as it does not cause a chemical change of a battery and has conductivity and may be for example, graphite such as natural graphite or artificial graphite; a carbon-based material such as carbon black, acetylene black, ketjen black, channel black, furnace black, lamp black, summer black and the like; a conductive fiber such as a carbon fiber or a metal fiber, and the like; carbon fluoride; a metal powder such as an aluminum or nickel powder; zinc oxide, a conductive whisker such as potassium titanate, and the like; a conductive metal oxide such as a titanium oxide; a conductive material such as a polyphenylene derivative, and the like.

The amount of the conductive agent may be 1 to 5 parts by weight based on a total weight, 100 parts by weight of the cathode active material. When the amount of the conductive agent is within the range, conductivity characteristics of the resultant electrode are improved.

Non-limiting examples of the solvent may be N-methyl pyrrolidone, and the like.

The cathode current collector may have a thickness of 3 μm to 500 μm, is not particularly limited as long as it does not cause a chemical change in the battery and has high conductivity, and may be for example, stainless steel, aluminum, nickel, titanium, heat-treated carbon, or aluminum or stainless steel of which the surface is treated with carbon, nickel, titanium, or silver. The current collector may have fine irregularities formed on a surface thereof to increase adhesive force of the cathode active material, and various forms such as a film, a sheet, a foil, a net, a porous body, foam, or a non-woven fabric body.

Separately, an anode active material, a binder, a conductive agent, and a solvent are mixed to prepare a composition for an anode active material layer.

The anode active material may use a material capable of intercalating and deintercalating lithium ions. Non-limiting examples of the anode active material may be a carbon-based material such as graphite or carbon, a lithium metal, an alloy thereof, a silicon oxide-based material, and the like. According to an embodiment of the present invention, silicon oxide may be used.

The binder may be added in an amount of 1 part by weight to 50 parts by weight based on a total weight, 100 parts by weight of the anode active material. Non-limiting examples of the binder may be the same as the cathode.

The conductive agent may be omitted depending on the type of the anode active material included in the composition for forming the anode active material layer, for example, 0 to 5 parts by weight based on 100 parts by weight of the total weight of the anode active material. When the amount of the conductive agent is within the range, conductivity characteristics of the resultant electrode are improved.

The conductive agent and the solvent may use the same materials as those used in producing the cathode.

The anode current collector may have a thickness of 3 μm to 500 μm. Such an anode current collector is not particularly limited as long as it does not cause a chemical change in the battery and has high conductivity and may be for example, copper, stainless steel, aluminum, nickel, titanium, heat-treated carbon, copper, or stainless steel of which the surface is treated with carbon, nickel, titanium, or silver, an aluminum-cadmium alloy, and the like. In addition, it may have fine irregularities formed on a surface thereof to increase adhesive force of the negative active materials, and various forms such as a film, a sheet, a foil, a net, a porous body, foam, or a non-woven fabric body, like the cathode current collector.

A separator is disposed between the cathode and anode produced according to the aforementioned processes.

The separator may generally have a pore diameter of 0.01 to 10 μm and a thickness of 5 to 300 μm. Specific examples may be an olefin-based polymer such as polypropylene, polyethylene, and the like; or a sheet or a nonwoven fabric formed of a glass fiber. In the case that a solid electrolyte such as a polymer is used as the electrolyte, the solid electrolyte may also serve as the separator.

A lithium salt-containing non-aqueous electrolyte may be composed of a non-aqueous electrolyte and a lithium salt. The non-aqueous electrolyte may be a non-aqueous electrolyte, an organic solid electrolyte, or inorganic solid electrolyte.

The non-aqueous electrolyte may be for example aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, a propylene carbonate derivative, a tetrahydrofuran derivative, ether, methyl propionate, ethyl propionate, or a combination thereof.

The organic solid electrolyte may be for example a polyethylene derivative, a polyethylene oxide derivative, a polypropylene oxide derivative, a phosphoric acid ester polymer, polyester sulfide, polyvinyl alcohol, polyvinylidene fluoride, and the like.

The inorganic solid electrolyte may be for example $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt may be a material which is readily soluble in the non-aqueous electrolyte, and for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonates, tetraphenyl lithium borate, imides, and the like.

Thus, the aforementioned cathode 23, anode 22, and separator 24 are wound or folded to be accommodated in the battery case 25. Then, an organic electrolytic solution is injected into the battery case 25 and the battery case 25 is sealed with the cap assembly 26 to complete the lithium secondary battery 21 as shown in FIG. 2.

The battery case 25 may be cylindrical, prismatic, thin film, and the like. For example, the lithium secondary battery 21 may be a large-scale thin film-type battery. The lithium secondary battery may be a lithium ion battery. A cell structure including a separator between the cathode and the anode may be formed. The cell structure is stacked in a bi-cell structure and then impregnated with an organic electrolytic solution, and the resulting product is received in a pouch and sealed to complete a lithium ion polymer battery. In addition, a plurality of cell structures may be stacked to form a battery pack, and such a battery pack may be used for all devices requiring a high capacity and a high power. For example, it may be used for a laptop, a smart phone, an electric vehicle, and the like.

In addition, the lithium secondary battery has improved storage stability, cycle-life characteristics, and high-rate characteristics at a high temperature and may be used in an electric vehicle (EV). For example, it may be used in a hybrid vehicle such as a plug-in hybrid electric vehicle (PHEV).

The lithium secondary battery according to an embodiment uses the aforementioned cathode active material for a lithium secondary battery as a cathode active material and thus exhibits excellent electrochemical characteristics and stability.

In addition, when the lithium secondary battery according to an embodiment, for example, uses a lithium nickel cobalt manganese oxide, a size, a contact area, density, and the like of the primary particles alone are controlled without excessively increasing nickel content. Accordingly, a cathode active material having various compositions may be used to produce a cathode having excellent electrochemical characteristics and stability and a lithium secondary battery including the same.

Hereinafter, the embodiments are illustrated in more detail with reference to examples. These examples, however, are not in any sense to be interpreted as limiting the scope of the invention.

EXAMPLE

First, a composite metal hydroxide ($Ni_{0.6}Co_{0.2}Mn_{0.20}H$) powder was synthesized through a co-precipitation method described later. In the following preparing process, the nickel-based active material precursor was synthesized by using a raw metal material such as nickel sulfate, cobalt sulfate, and manganese sulfate.

[First Step: 1.5 kW/m$^3$, NH$_3$ 0.30 M, pH 10 to 11, Reaction Time: 6 Hours]

First, ammonia water having a concentration of 0.30 M was put in a reactor. The raw metal material and a complex agent were respectively added thereto to start a reaction at each speed of 90 ml/min and 10 ml/min with an agitation power of 1.5 kW/m$^3$ at a reaction temperature of 50° C.

The reaction was maintained for 6 hours, while NaOH was injected thereinto to maintain pH. As a result of the reaction, it was confirmed that the average size of the obtained core particles was in the range of about 5.5 μm to 6.5 μm, and then the second step was performed as follows.

[Second Step: 1.0 kW/m$^3$, NH$_3$ 0.35 M, pH 10 to 11, Reaction Time: 6 Hours]

The complex agent maintained a concentration of 0.35 M by changing the speeds of the raw metal material and the complex agent respectively into 100 ml/min and 15 ml/min, while the reaction temperature was maintained at 50° C. The reaction proceeded for 6 hours, while NaOH was injected thereinto to maintain pH. Herein, the agitation power was adjusted into 1.0 kW/m$^3$, which is lower than that of the first step. After performing this reaction, it was confirmed that the average size of the product particles containing the core and the intermediate layer was 9 μm to 10 μm, and then the third step was performed as follows.

[Third Step: 1.0 kW/m$^3$, NH$_3$ 0.40 M, pH 10 to 11, Reaction Time: 4 Hours]

The speeds of the raw metal material and the complex agent were respectively changed into 150 ml/min and 20 ml/min to adjust the concentration of the complex agent into 0.40 M, while the reaction temperature was maintained at 50° C. The reaction proceeded for 4 hours, while NaOH was injected thereinto to maintain pH. Herein, the agitation power was maintained equally to that of the second step.

Subsequently, the slurry solution in the reactor was filtered and then, dried in a hot air oven for 24 hours to obtain composite metal hydroxide ($Ni_{0.6}Co_{0.2}Mn_{0.2}(OH)_2$) powder. The obtained powder consisted of radial, porous, and plate and needle shaped primary particles.

Subsequently, the composite metal hydroxide ($Ni_{0.6}Co_{0.2}Mn_{0.2}(OH)_2$) powder was dry-mixed with lithium hydroxide (LiOH) in a mole ratio of 1:1 by using a high speed mixer and then, heat-treated at about 700° C. for 6 hours under an oxygen atmosphere with an exhaust of a firing furnace open to obtain a nickel-based active material ($LiNi_{0.6}Co_{0.2}Mn_{0.2}O_2$). This nickel-based active material was heat-treated again at about 800° C. for 6 hours under an air atmosphere with the exhaust 50% open to obtain cathode active material ($LiNi_{0.6}Co_{0.2}Mn_{0.2}O_2$) secondary particles according to Example 1.

Comparative Example 1

A cathode active material (secondary particles shown in FIG. 8) according to Comparative Example 1 was obtained according to the same method as example except that the reheat-treatment was performed at 860° C. for 6 hours.

Comparative Example 2

A cathode active material (secondary particles shown in FIG. 9) according to Comparative Example 2 was obtained according to the same method as example except that the reheat-treatment was performed at 840° C. for 6 hours.

Comparative Example 3

A cathode active material (secondary particles shown in FIG. 10) according to Comparative Example 3 was obtained according to the same method as example except that the reheat-treatment was performed at 820° C. for 6 hours.

Evaluation 1: Evaluation of Primary Particle Properties Through Two-Dimensional Image of Surface of Secondary Particle Each surface of the cathode active materials according to example and comparative examples was examined with a scanning electron microscope (magnification: 40,000 times) to obtain two-dimensional images. Subsequently, the two-dimensional images were analyzed by using the aforementioned image analysis program (JNOptic Leopard iXG). The analyzed two-dimensional images, as shown in FIG. 3, showed that primary particles and pores were respectively separated, and boundary lines of the primary particles and the pores were respectively set.

FIGS. 8 to 10 are views in which boundary lines between the primary particles and the pores are respectively highlighted in the two-dimensional images measuring the surface of the secondary particles according to Comparative Examples 1 to 3. FIG. 2 shows a two-dimensional analyzed image of the surfaces of the secondary particles according to the Example, and FIGS. 8 to 10 respectively show two-dimensional analyzed images of the surfaces of the secondary particles according to the Comparative Examples 1 to 3.

Subsequently, a predetermined boundary line set at each distinguished primary particle in the analyzed two-dimensional image is all summed to add up all the primary particle circumferences (even when the boundary lines of the primary particles contact one another, the boundary lines are repetitively included), and the total primary particle circumference was divided by an area (width×length=3.12 μm×2.18 μm=6.8016 pmt) of the two-dimensional image to calculate a primary particle coefficient.

On the other hand, sizes of the primary particles in the two-dimensional image are measured and averaged to obtain an average size of the primary particles.

Subsequently, the calculated primary particle coefficient, the total primary particle circumference, and the average size of the primary particles are respectively shown in Table 1.

TABLE 1

|  | Primary particle coefficient ($\mu m^{-1}$) | Total primary particle circumference ($\mu m$) | Average size of primary particle ($\mu m$) |
| --- | --- | --- | --- |
| Example | 43.5 | 295.9 | 0.5 |
| Comparative Example 1 | 12.7 | 86.3 | 1.6 |
| Comparative Example 2 | 86.3 | 134.8 | 1.1 |
| Comparative Example 3 | 1.6 | 200.3 | 0.8 |

Referring to Table 1, the primary particle coefficient and the total primary particle circumference of example were all larger than those of comparative examples, but the primary particle average size of example was smaller than those of comparative examples. Referring to FIGS. 3 and 8 to 10, the primary particles of example had a significantly smaller size than those of comparative examples, but contact areas or density of the primary particles thereof was very larger than those of comparative examples.

Evaluation 2: Evaluation of Physical/Mechanical Properties of Secondary Particles The secondary particles of the cathode active materials according to example and Comparative Example 2 were measured with respect to particle strength by using a micro compression testing machine (MCT-W500-E, Shimadzu Corp.). A cone-type flat indenter having a diameter of 50 μm was used, and when secondary particles were pressed with a pressure of 100 mN with this indenter, a pressure where the secondary particles were broken was measured.

Any 10 secondary particles were taken from each cathode active material according to example and Comparative Example 2 and then, measured with respect to particle strength and averaged. The calculated average particle strengths are shown in Table 2.

TABLE 2

|  | Example | Comparative Example 2 |
| --- | --- | --- |
| Average | 79.975 MPa | 50.676 MPa |

Referring to Table 2, the cathode active material secondary particles according to example maintained particle strength of about 80 MPa, but the cathode active material particles according to Comparative Example 2 exhibited particle strength of about 50 MPa. Accordingly, according to an embodiment, a size, a contact area, and density of the primary particles may be controlled to improve physical/mechanical characteristics.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| 30: lithium secondary battery | 32: anode |
| --- | --- |
| 33: cathode | 34: separator |
| 35: battery case | 36: cap assembly |

The invention claimed is:

1. A cathode active material for a lithium secondary battery, the cathode active material comprising:
   secondary particles, each of the secondary particles comprising an aggregate of two or more primary particles,
   wherein, at a surface of the secondary particles, a primary particle coefficient is greater than or equal to 30 $\mu m^{-1}$ and less than or equal to 60 $\mu m^{-1}$ and a total circumferential length of the primary particles is greater than or equal to 220 μm,
   an average size of the primary particles based on a two-dimensional image measuring the surface of the secondary particles is less than or equal to 0.5 μm,
   an average particle strength of the secondary particles is greater than or equal to 70 MPa and less than or equal to 100 MPa, and
   the primary particle coefficient is measured at the surface of the secondary particles and not at a cross-section of the secondary particles exposed through cutting the cathode active material.

2. The cathode active material of claim 1, wherein at least a portion of the primary particles has a radial arrangement structure.

3. The cathode active material of claim 1, wherein
   the secondary particles have a radial array structure or comprise an internal portion comprising an irregular porous structure and an external portion comprising a radial array structure.

4. The cathode active material of claim 1, wherein the secondary particles comprise an external portion having a radial arrangement structure and an internal portion comprising an irregular porous structure.

5. The cathode active material of claim 1, wherein an average size of the secondary particles is 5 μm to 30 μm.

6. The cathode active material of claim 1, wherein the primary particles have at least one shape of a plate shape or a needle shape, and at least a portion of the primary particles has a long axis arranged in a radial direction.

7. The cathode active material of claim 1, wherein the cathode active material for the lithium secondary battery is represented by Chemical Formula 1:

$$Li_a(Ni_{1-x-y-z}Co_xMn_yM_z)O_2 \quad \text{[Chemical Formula 1]}$$

wherein, in Chemical Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.3$, $x \leq (1-x-y-z)$, $y \leq (1-x-y-z)$, $0<x<1$, $0 \leq y<1$, and $0 \leq z<1$.

8. A cathode comprising the cathode active material of claim 1.

9. A lithium secondary battery comprising:
the cathode of claim 8;
an anode; and
a separator between the cathode and the anode.

10. The cathode active material of claim 1, wherein each of the secondary particles comprises pores defined between the primary particles and the pores have an average pore diameter of 1 nm to 50 nm measured from the surface of the secondary particles.

* * * * *